United States Patent
Cleereman et al.

(10) Patent No.: US 6,719,381 B2
(45) Date of Patent: Apr. 13, 2004

(54) RUGGED ENCLOSURE WITH PASS THROUGH ENERGY MANAGEMENT RIBS

(75) Inventors: Robert J. Cleereman, Midland, MI (US); Michael E. Hus, Midland, MI (US); Jeffrey D. Wenzel, Saginaw, MI (US); Joseph A. Langmaid, Caro, MI (US); Frank J. Flavin, Midland, MI (US); Mary M. Hoagland, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/163,715

(22) Filed: Jun. 4, 2002

(65) Prior Publication Data

US 2002/0195909 A1 Dec. 26, 2002

Related U.S. Application Data

(60) Provisional application No. 60/300,579, filed on Jun. 23, 2001.

(51) Int. Cl.$^7$ ............................................. A47B 81/00
(52) U.S. Cl. .................................................. 312/223.2
(58) Field of Search .......................... 312/223.1, 223.2, 312/7.2, 265.6; 220/254.3, 254.6, 254.1, 4.24, 402, 259.1, 671, 675; 224/246, 929, 930; 206/523, 524

(56) References Cited

U.S. PATENT DOCUMENTS

| | | |
|---|---|---|
| 5,373,458 A | 12/1994 | Bishay et al. |
| 5,563,674 A | 10/1996 | Von Holtz et al. |
| 5,950,638 A | 9/1999 | Crosta |
| 6,144,552 A | 11/2000 | Whitcher et al. |
| 6,202,887 B1 | 3/2001 | Petit |

FOREIGN PATENT DOCUMENTS

| | | |
|---|---|---|
| DE | 198 30 264 A1 | 1/2000 |
| DE | 29918158 U1 | 2/2000 |
| DE | 299 18 252 | 3/2001 |
| EP | 1 098 389 A1 | 9/2001 |
| GB | 2348391 | 10/2000 |
| JP | 98145056 A | 5/1998 |

Primary Examiner—Ramon O. Ramirez
Assistant Examiner—Kofi Schulterbrandt

(57) ABSTRACT

A protective enclosure is disclosed that provides protection and energy management for a sensitive or fragile part or device that can be enclosed. The enclosure comprises one or more rigid structural components and one or more soft touch surface components from which one or more ribs originate and pass through the rigid structural component(s) to provide the energy management for the part or device when it is enclosed. The soft touch surface and rib material can be a low modulus, plastic material such as a thermoplastic elastomer and can optionally be foamed to provide further softness for the soft touch surface effect and/or for the energy management needs in the pass through ribs. Thermoplastic polyurethane (TPU) is a particularly suitable thermoplastic. It has also been found that the protective enclosure can be designed to utilize the soft touch component to provide a substantially continuous liquid and dust resistant seal for any moveable or removable structural components. Preferably the pass through ribs and the soft touch surface are molded onto the first rigid component(s) by molding them onto the first component using a two shot molding, insert molding or overmolding process.

6 Claims, 3 Drawing Sheets

RUGGED ENCLOSURE WITH PASS THROUGH ENERGY MANAGEMENT RIBS

CROSS REFERENCE STATEMENT

This application claims the benefit of U.S. Provisional Application No. 60/300,579, filed Jun. 23, 2001.

BACKGROUND OF THE INVENTION

The present invention relates to a protective enclosure that uses a unique support structure for energy management and enclosure reliability based on integral, low modulus ribs that pass through the rigid structural component(s) and preferably originate from one or more soft touch surface components. These ribs provide means for energy management and advantageously can use a common soft touch component material which can also provide enclosure sealing. It also relates to a process for making a protective enclosure having integral, low modulus ribs that pass through the rigid structural component(s), preferably from one or more soft touch surface components that can also provide the enclosure with sealing.

Portable electronic devices and similar types of personal devices, such as cell phones, pagers, personal digital assistants (PDAs), gaming devices, electronic music players, voice recorders, global positioning systems (GPS), digital or conventional film cameras, etc. have become commonplace in today's society. These personal devices have found utility in all aspects of life including personal and/or professional activities. In most environments, and in industrial and/or outdoor environments in particular, these types of devices are subject to rough handling, occasional impact forces from being dropped or struck, and exposure to liquids, dust, foods, grease, moisture and other contaminants. Thus, in order to continue to operate properly in such environments, these types of devices need a protective enclosure that provides impact resistance, provides a tight seal against liquid or other contaminants, and preferably provides both, to protect sensitive interior components and especially sensitive electronic elements.

The incorporation of so-called soft touch elements into the surface of these devices is well known and provides a range of aesthetic, ergonomic and performance benefits for the device and its use. See for example U.S. Pat. No. 5,563,674 describing the "ergonomic" issues of soft touch, and specifically anti-slipping characteristics (e.g. to prevent dropping a camera). Similarly, Patent GB 2,348,391 also shows soft touch features in devices and the process of soft touch molding.

There is simultaneously a great interest in making these devices as compact as possible and obtaining the maximum numbers of functions in minimum volumes. Prior art techniques have attempted to solve these problems in several ways. Regarding energy management, commonly referred to as impact resistance or toughness, small, portable electronic products such as Personal Data Assistants (PDAs), and lap top computers, that use glass touch screens or displays are extremely susceptible to damage or failure due to being dropped or accidentally abused. The problem is compounded by the fact that these devices are small, portable, designed to be used everywhere, expensive, and fragile. Normal "ruggedized" enclosures provide energy management by packaging the device in a large, bulky box and using shock absorbing inserts or mounts. See for example U.S. Pat. No. 6,144,552 and German Publication DE 19830264. The size and user issues associated with this type of package precludes their use in many instances.

Also, if the opening, closing and/or movable parts of an enclosure are designed to be re-sealable against liquid, dust and the like, they are typically sealed with one or more gaskets made from foam or a deformable material. However, it is well known that these gaskets leak with time and exposure to environmental contamination and cleaning fluids as well as due to differential thermal expansion/contraction. In addition, they also require the use of additional assembly and operation steps to add and seat the gasket(s) itself and, if not attached and seated properly after each opening/closing event, do not always function effectively. In U.S. Pat. No. 5,373,458 it is shown that an overmolded rim of resilient material can provide an enclosure with a seal and a tactile surface but only limited impact resistance can be provided and further resilient gasket pieces are needed.

Accordingly a need exists for a protective enclosure having the benefit of a desirable soft touch surface material for ergonomics and aesthetics that also provides an effective liquid and dust tight seal as well as highly effective and multidirectional pass-through energy management ribs. Preferably combinations of these features are simultaneously provided. Further, it is desirable that the number of parts, assembly steps and hence the cost can be reduced.

SUMMARY OF THE INVENTION

Therefore, according to the present invention there is provided a protective enclosure that provides protection and energy management for a sensitive or fragile part or device that can be enclosed, the enclosure comprising one or more rigid structural components and one or more soft touch surface components and having one or more low modulus ribs that are designed appropriately to position and seat the part or device when it is enclosed, such ribs originating from the soft touch surface component and passing through the rigid structural component(s) to provide the protection and energy management for the part or device when it is enclosed. Preferably the soft touch surface component comprises a surface layer over at least a part of one or more of the rigid structural component and more preferably the surface layer sections of the soft touch component have a thickness of from about 0.05 to about 5 millimeters.

In a further embodiment, the protective enclosure has a moveable structural component that (a) opens to provide an opening to receive or remove a device that is protectively enclosed and (b) closes to provide a substantially continuous liquid and dust resistant seal provided by the soft touch component(s). It has also been found that the soft touch component is advantageously prepared from a low modulus, plastic material, preferably a thermoplastic elastomer.

There is also provided a process for producing a protective enclosure part comprising at least one rigid structural component and at least one soft touch surface component and having one or more low modulus ribs for positioning and seating an enclosed part or device, such ribs originating from the soft touch surface component and passing through the rigid structural component(s), the process comprising the steps of (a) first molding the rigid component(s) and (b) subsequently attaching onto the first component the pass through ribs and the soft touch surface. Preferably the pass through ribs and the soft touch surface are molded onto the first rigid component(s) from step (a) by subsequently molding them onto the first component using a two shot molding, insert molding or overmolding process.

DETAILED DESCRIPTION

Figure 1:
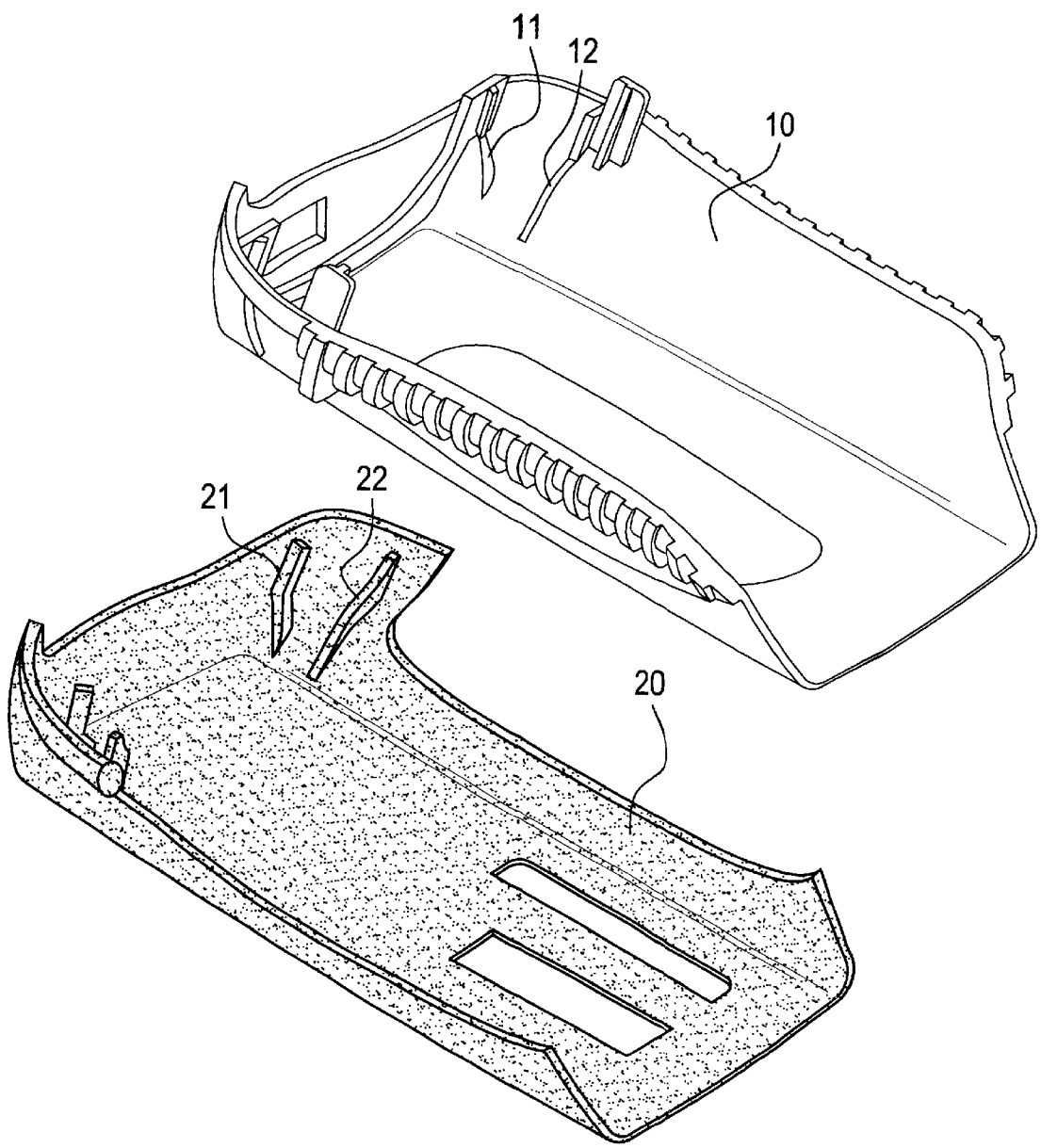
FIG. 1 is an exploded perspective view showing the rigid section (10) and low modulus (soft touch) section (20) of the bottom piece of a protective enclosure where the low modulus ribs (21 and 22) are quite thin and flat and will pass through slots in the rigid section (11 and 12, respectively) and provide energy management that will be tailored for an electronic part or device that is to be housed in the enclosure.
Figure 2:
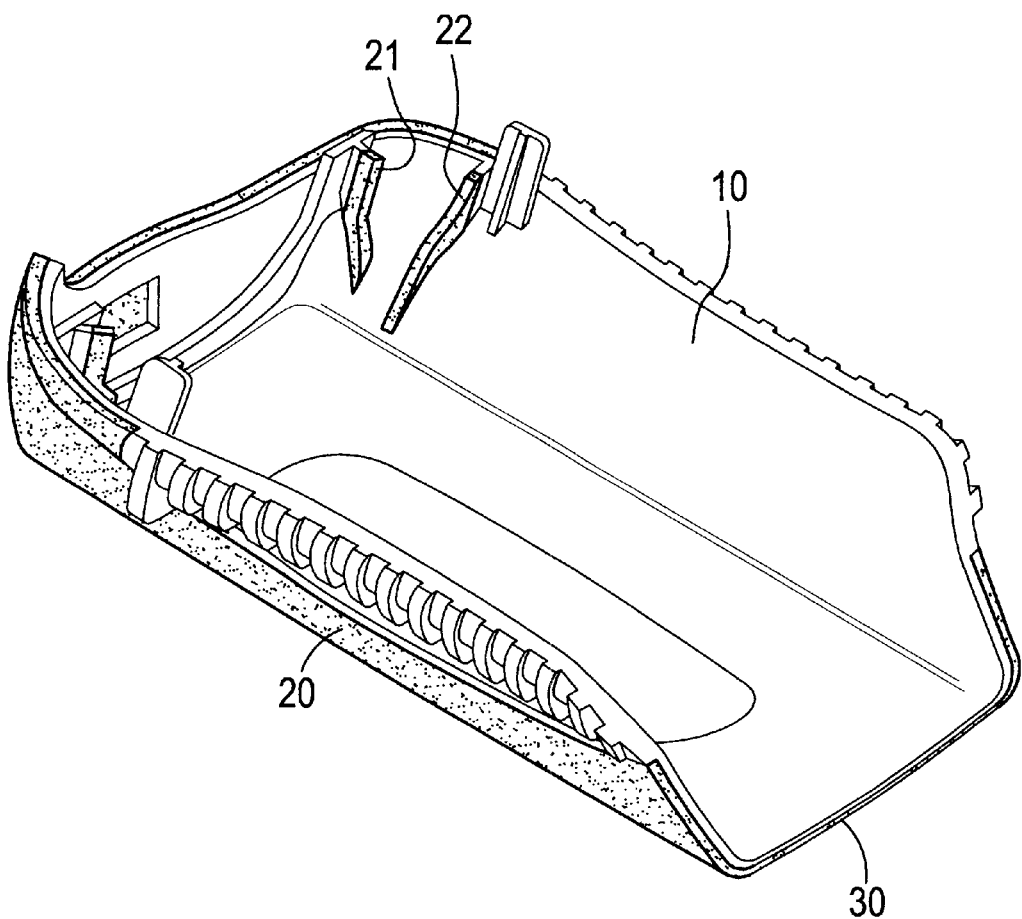
FIG. 2 is a perspective view of the bottom piece of the enclosure (30) with the rigid section (10) and low modulus section (20) together and the low modulus ribs (21 and 22) projecting through the rigid section and situated to receive and seat an electronic device or part that will be protectively enclosed.
Figure 3:
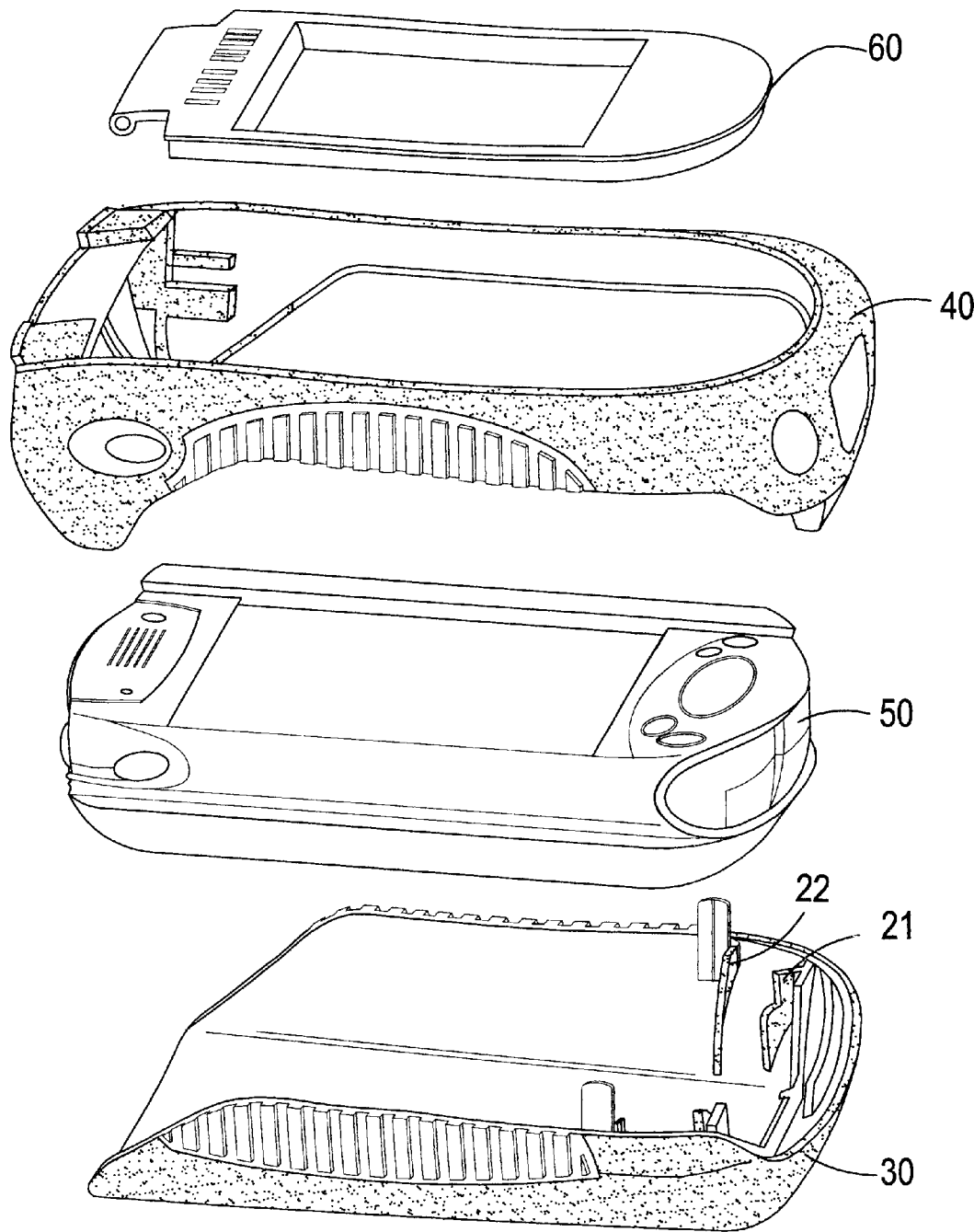
FIG. 3 is an exploded perspective view showing the arrangement of the enclosure bottom (30), enclosure top (40) and optional, hinged protective window (60) with an optional PDA device (50) that will be protectively enclosed when entire device is assembled. In the enclosure top (40) it can also be seen that rigid and low modulus soft touch materials are used to provide impact resistant pass through ribs to provide the desired location and seating of the electronic device.

As mentioned above, one embodiment of the present invention is a protective enclosure having one or more thin, low modulus ribs that preferably originate from a soft touch surface component and pass through the rigid structural component(s) to provide means for protection and energy management for an sensitive or fragile part or device that is enclosed. It also relates to a process for making a protective enclosure of this type, preferably with a two shot or overmolding process that provides the pass through ribs and the soft touch surface.

In one embodiment, the present invention is a protective enclosure that uses a unique support structure for energy management and enclosure reliability based on thin, low modulus ribs that preferably originate from a soft touch surface component and pass through the rigid structural component(s). This concept preferably uses a surface soft touch material along with two shot molding (or an equivalent molding technology such as overmolding or insert molding) coupled with an appropriate design that allows these "pass through" ribs to be molded in the soft touch step (usually the second shot in two shot molding). These ribs are then designed appropriately to provide the precise geometry needed for positioning and seating the valuable and fragile electronic components or separate electronic device while at the same time providing dynamic energy absorption in very little space. Many advantages are obtained in the manufacture of a device with multiple, low modulus, thin ribs molded integrally into an enclosure made of higher modulus material to provide packaging reliability and impact energy absorption with minimum enclosure size or bulkiness. The enclosure is used to enclose fragile electronic parts, components or inserted separable devices and prevent their failure or breakage due to drop or other abuse.

Utilizing precisely designed and placed ribs molded from low modulus material integral within a higher modulus, rigid enclosure gives a "hybrid" type structure that provides ruggedness, energy management and packaging reliability. The higher modulus material provides the toughness necessary for rough use and the lower modulus "ribs" provides energy management. These ribs are preferably molded as "pass through protrusions" into and through a range of aperture types in the higher modulus or rigid components that form the package such as round holes, square holes, thin slits or more complex shapes such as "S", "X", "T", "O", "V" or star shapes. Rib design and optimization is a function of the mass being protected, the material modulus and the length and thickness of the rib. The actual rib structures can be chosen and designed for the desired combinations of supporting, locating, padding, insulating and cradling the device that is being enclosed. The rib design provides extremely efficient energy management in a very small space thereby allowing simple, compact, user friendly, ruggedized enclosures. In a preferred, two shot injection molding process, the entire manufacturing operation can be done within a single machine, and under total and precise geometric control. This enables extreme precision in geometry creation thereby increasing the overall reliability of the package and the designer's ability to "tailor" the energy managing ribs as desired. It is also possible to design the higher modulus, rigid component to have a support or foundation element in place at or near the pass through aperture for the subsequent overmolding by the pass through low modulus material and to thereby provide optimized and complete energy management support for the enclosed device.

In a preferred embodiment a surface component of soft touch material is used that can simultaneously provide the surface soft touch effect and the desired level of energy management and impact resistance in the ribs that pass through rigid component. A further very desirable feature of a soft touch surface with a pass through rib or protrusion is the ability to be designed with sufficient flexural properties and located in a position necessary to both protect and provide activating energy to a button, key, latch or switch on the enclosed device or a sealed mechanism in the enclosure itself such as a latching mechanism. The outside or external surface (directly opposite the rib or protrusion on the inside) can effectively be an active button or key that permits the rib or protrusion on the underside to operate the enclosed device within the completely sealed enclosure or the sealed enclosure latching mechanism. In a further preferred embodiment, the soft touch material also used in a surface soft touch component is used to provide a seal between all adjacent moveable or removable enclosure parts by appropriate part design and molding techniques to ensure that constant and sufficient contact is obtained to seal all joints. In this fashion the seal surfaces can either be conventional flat, straight lines (i.e., linear) or they can be any sort of contours or meanders that are very difficult or impossible with a separate gasket piece but might be desired for aesthetic reasons or to accommodate seal shapes specific to the various locations where access may be needed for insertion or removal of the enclosed device, batteries or peripheral/attachment ports.

The energy management ribs and/or soft touch surfaces can be made from any low modulus, plastic material, including suitable thermoplastics such as thermoplastic elastomers, thermoplastic elastomer vulcanizates, thermoplastic silicone vulcanizates or thermoset resins, any of which can optionally be foamed to provide further softness for the soft touch surface effect and/or for the energy management needs in the pass through ribs. A particularly suitable thermoplastic elastomer is a thermoplastic polyurethane polymer (TPU), preferably an injection moldable TPU material such as Pellethane 2102-75A supplied by The Dow Chemical Company. Another suitable material is a thermosetting polyurethane foam capable of providing a sufficient surface skin. Other suitable materials include other thermoplastic elastomers (TPE's) such as a polyolefin TPE, a styrene-ethylene/butylene-styrene (SEBS) block co-polymer. Suitable thermoplastic elastomers are described, for example, in Billmeyer, F. Textbook of Polymer Science, Interscience Publishers, New York, N.Y. (1965) and in Kirk-Othmer Science of Chemical Technology 4th Ed, John Wiley & Sons, New York, N.Y. (1993).

When a soft touch surface layer is used, the thickness for this layer of this layer is typically on the order of from about 0.05 to about 5 millimeters ("mm"), preferably at least about 0.5 mm, with thicker soft touch surface layers of up to 25 mm usable in cases where the material is foamed.

The preferred embodiment utilizes two shot injection molding for most efficient part manufacture and therefore the rib materials need to be thermoplastic and sufficiently compatible with the enclosure material to achieve the necessary bonding. Other processes generally known in the molding industry can also be used where the desired combination of pass through ribs and optional soft touch and seal effects are provided. In general, other such process could allow non-thermoplastics to be used as well.

The thin-rib energy management design uses thermoplastic polyurethane (TPU) at a thickness ranging from 0.75 mm to 1.5 mm. (The thickness and rib geometry is critical to energy absorption capability and is variable as necessary.) These ribs are molded integrally into a high strength Polycarbonate (PC) housing through thin slits created in the PC housing in the first step of the molding process. Utilizing two step injection molding, the TPU material is injected immediately after the PC into a mold that provides altered geometry thereby creating new features in the existing part, this time of the 2nd material, the TPU. Being able to mold these two dissimilar but compatible materials integrally together within the same molding machine provides precise package geometry fabrication at very reasonable cost. This precise geometry creation is the basis for package reliability.

The rigid material can be selected from a wide range of engineering plastic resins including styrenic polymers and copolymers such as polystyrene and ABS, polycarbonates such as CALIBRE 401-18 polycarbonate (PC), a high flow tough material manufactured by The Dow Chemical Company and nylon molding resins. Non-thermoplastics such as magnesium could also be utilized as well with the proper selection and design of the fabrication technology.

The above mentioned TPU and PC resins are good examples of the low modulus and rigid materials that provide a good balance of the desired material properties. The two materials used in this example case are representative of a much larger array of options with respect to materials. Other thermoplastics choices and combinations of rigid and low modulus materials are also capable of providing similar structure. They should be selected to provide the desired combinations of processability, modulus, strength, rigidity, and compatibility. Preferably, in a preferred process according to the present invention, they can be injection molded in the same injection molding machine, preferably in a two shot molding process or an overmolding process. Non-thermoplastics such as magnesium could also be utilized as well with the proper selection and design of the fabrication technology.

What is claimed is:

1. A protective enclosure that provides protection and energy management for a sensitive or fragile part or device that can be enclosed, the enclosure comprising one or more rigid structural components and one or more soft touch surface components and having one or more low modulus ribs that are designed appropriately to position and seat the part or device when it is enclosed, such ribs originating from the soft touch surface component and passing through the rigid structural component(S) to provide the energy management for the part or device when it is enclosed.

2. The protective enclosure according to claim 1 wherein the soft touch surface component comprises a surface layer over at least a part of one or more of the rigid structural components.

3. The protective enclosure according to claim 1 wherein the surface layer sections of the soft touch component have a thickness of from about 0.05 to about 5 millimeters.

4. The protective enclosure according to claim 1 wherein there is a moveable structural component that (a) opens to provide an opening to receive or remove a device that is protectively enclosed and (b) closes to provide a substantially continuous liquid and dust resistant seal provided by the soft touch component(s).

5. The protective enclosure according to claim 1 wherein the soft touch component is prepared from a low modulus, plastic material.

6. The protective enclosure according to claim 5 wherein the soft touch component plastic material is a thermoplastic polyolefin elastomer, a thermoplastic silicone vulcanizate or a thermoplastic polyurethane.

* * * * *